(12) United States Patent
Kaszubski et al.

(10) Patent No.: US 7,211,616 B2
(45) Date of Patent: May 1, 2007

(54) MOISTURE CURABLE ADHESIVE

(75) Inventors: Glen Kaszubski, Copley, OH (US); John A. Paul, Wickliffe, OH (US); Mark Stypczynski, Wickliffe, OH (US); Leo August Tischer, Parma, OH (US)

(73) Assignee: The Glidden Company, Strongsville, OH (US)

(*) Notice: Subject to any disclaimer, the term of this patent is extended or adjusted under 35 U.S.C. 154(b) by 105 days.

(21) Appl. No.: 10/075,203

(22) Filed: Feb. 14, 2002

(65) Prior Publication Data
US 2003/0153671 A1 Aug. 14, 2003

(51) Int. Cl.
*C08K 3/36* (2006.01)
*C08J 9/32* (2006.01)

(52) U.S. Cl. ............... 524/493; 524/588; 524/866; 523/218; 523/219

(58) Field of Classification Search ........... 524/493, 524/866, 588; 528/32; 523/218, 219
See application file for complete search history.

(56) References Cited

U.S. PATENT DOCUMENTS

| | | | | |
|---|---|---|---|---|
| 4,308,621 A | * | 12/1981 | Mendelson | 455/278.1 |
| 4,593,068 A | * | 6/1986 | Hirose et al. | 525/100 |
| 4,760,123 A | * | 7/1988 | Imai et al. | 528/18 |
| 5,298,572 A | * | 3/1994 | Katz | 525/419 |
| 5,304,621 A | * | 4/1994 | Staiger et al. | 528/12 |
| 5,459,205 A | * | 10/1995 | Furukawa et al. | 525/446 |
| 6,013,749 A | * | 1/2000 | Baba et al. | 526/279 |
| 6,686,047 B2 | * | 2/2004 | Yamaguchi et al. | 428/407 |
| 2004/0116547 A1 | * | 6/2004 | Bennington | |

FOREIGN PATENT DOCUMENTS

| | | |
|---|---|---|
| EP | 0 106 330 A1 | 4/1984 |
| EP | 0 442 380 B1 | 8/1991 |
| EP | 0 673 972 A1 | 9/1995 |
| EP | 0 442 380 B1 | 5/1996 |
| EP | 0 857 771 A2 | 8/1998 |
| EP | 1 041 119 A2 | 10/2000 |
| EP | 1 279 709 A1 | 1/2003 |
| JP | 2001311056 | 11/2001 |
| WO | WO 00 37534 A1 | 6/2000 |

OTHER PUBLICATIONS

Product Brochure, "MS Polymer Silyl", Kaneka Corporation, 1999.

* cited by examiner

*Primary Examiner*—Tae H Yoon

(57) ABSTRACT

The present invention relates to an adhesive and more particularly to a moisture curable adhesive. In one embodiment, the present invention includes a moisture curable adhesive comprising a polymer or copolymer including reactive silicon end groups; from about 0.01 to about 40 percent by weight of a clear filler that will not substantially interfere with the clarity of the adhesive; and from about 0.01 to about 10 percent by weight of a dehydrating agent. In another embodiment, the present invention includes a moisture curable adhesive comprising a copolymer including a reactive silicon group; from about 33 to about 85 percent by weight of a filler; and from about 0.01 to about 10 percent by weight of a dehydrating agent. The present invention is further directed to a method of joining two adherends.

50 Claims, No Drawings

MOISTURE CURABLE ADHESIVE

BACKGROUND OF THE INVENTION

1. Field of the Invention

The present invention relates to an adhesive and more particularly to a moisture curable adhesive. The present invention is further directed to a method of joining two adherends.

2. Technology Review

Adhesives are commonly used to join or fasten two or more adherends. Adherends are considered as being any two or more materials, or pieces of material that are being joined together, including wood, metals, paper, ceramics, stone, glass, concrete, etc. Adhesives used for these purposes are based on a wide range of technologies, including elastomer/solvent/resin mixtures, epoxies, latexes, polyurethanes, silicones, cyanoacrylates, acrylics, hot melts, and others. These adhesives each have a number of drawbacks.

Adhesives based on elastomer/solvent/resin mixtures, henceforth referred to as rubber-based adhesives, contain solvents which are toxic and, most often, flammable. Despite these hazards, rubber-based adhesives are popular due to their ease of use. Epoxy, acrylic, some polyurethane, and some silicone adhesives are formulated into two-component systems consisting of a base containing monomers, oligomers, and polymers, and a hardener or curative component, consisting of catalysts and curing agents. These systems require accurate measuring and thorough mixing to develop the properties that make them useful as adhesives. The individual raw materials in two-component adhesive products, monomers, oligomers, catalysts, and curing agents, can be toxic and often allergenic. Latex adhesives are low toxicity, non-flammable materials, which harden through evaporation of water. While effective in many applications, latex adhesives do not perform well in low temperature environments, on metals, on many plastics, and in wet or humid environments. In conditions of low temperature or high humidity, the drying time of latex adhesives can be greatly extended, sometimes for days. On the other hand, hot melt adhesives, being thermoplastic by definition, lose strength in warm conditions, limiting the applications in which they can be used. Additionally, hot melt adhesives require a source of heat for application, which further limits their use. These heat sources and the application of hot adhesive present a safety (burn) hazard to the user. Single component adhesives, such as polyurethanes and silicones, cure by reaction with moisture in air or on the adherends. Polyurethanes develop tack slowly, requiring that the adherends be held or fixtured in place (bracing or taping) until the adhesive has cured enough to hold them in place without being held. The same applies for single component silicone adhesives. Further, in a portion of the population, allergic reactions can result from exposure to polyurethane adhesives. In addition to the problems listed above, solvent and water based adhesives generally exhibit a high degree of shrinkage due to the volatile content of the adhesives.

The longevity and durability of adhesive bonding is dependent on a number of factors, including but not limited to surface properties of the adherends, the type and properties of the adhesive used in the bonding application, environmental conditions (temperature, humidity, etc.), the design of the adhesive joint, and the method of joining or assembling the adhesive and adherends together. High solids content adhesives solve some of the problems encountered with these other types of adhesives (i.e., shrinkage, amount of volatiles, etc), however the best of these adhesives present other drawbacks. For instance, European Patent 0 442 380 B 1 describes the use of a high solids content moisture curable adhesive with which two adherends can be bonded together. The patent description, however, indicates if the adhesive "is applied to thickly, the adhesive cannot form a sufficient tacking force (tackiness), and becomes weak in the contact ability. It is therefore preferable that the adhesive be applied in the thickness of approximately 1 mm or less so as to increase the tack."

The need to apply a thin layer of adhesive limits the applications an adhesive can be used for, and the means (i.e., roller, etc) for applying the adhesive. To apply thin layers of adhesives it is helpful to have an adhesive that can maintain its adhesive properties, and will spread and flow across the substrate or adherend. If the viscosity of the adhesive is too high it can be difficult or impossible to apply a thin layer of adhesive (layers of 1 mm or less). One of the factors which influences the viscosity of an adhesive is the amount of filler in the adhesive. In general, the higher the filler content the higher the viscosity. Filler content also affects the tack of the adhesive. At higher filler contents, the tack is lower. This affect is even more pronounced when applying thin layers of adhesive resulting in an even greater reduction in the tack of the adhesive. Therefore, to get a high solids content adhesive with sufficient tack and a low enough viscosity to spread thinly it has been necessary to use formulations with relatively low filler content. Further, it has been difficult to even add filler to high solids content clear adhesives since most fillers including clear fillers will either block or refract light passing through an adhesive making the adhesive appear unclear. There is, however, a great need to increase the filler content of an adhesive since a higher filler content lowers the cost of an adhesive and reduces the environmental impact of manufacturing the adhesive.

Another problem associated with most good adhesives has been the repositionability of the adherends bonded by the adhesives. Conventionally, once an adhesive had developed enough tack to bond two adherends without clamps or some other type of temporary fasteners, then it was difficult to reposition the adhesive after contacting the adherends after more than a couple minutes. A need therefore exists for an adhesive, which develops tack rapidly so the two adherends to be bonded by the adhesive can be joined and held together without the use of clamps after a relatively short period of time, but where after joining the two adherends can be repositioned with respect to one another for a relatively long period of time.

It is therefore two of the objects of the present invention among the many objects of this invention to solve these problems.

SUMMARY OF THE INVENTION

The present invention relates to an adhesive and more particularly to a moisture curable adhesive. The present invention is further directed to a method of joining two adherends.

In one embodiment, the present invention includes a moisture curable adhesive comprising a polymer or copolymer including reactive silicon end groups; from about 0.1 to about 40 percent by weight of a clear filler that will not substantially interfere with the clarity of the adhesive; and from about 0.01 to about 10 percent by weight of a dehydrating agent.

In another embodiment, the present invention includes a moisture curable adhesive comprising a polymer or copolymer including reactive silicon end groups; from about 33 to about 85 percent by weight of a filler; and from about 0.01 to about 10 percent by weight of a dehydrating agent.

In another embodiment, the present invention includes a method of joining at least two adherends comprising the steps of applying a layer of from about 1.1 mm to about 7 mm of moisture curable adhesive comprising a polymer or copolymer including reactive silicon end groups to at least one adherend of two adherends; maintaining the two adherends in non-contact with each other until the adhesive begins to develop a sufficient tack to hold the at least two adherends together; and first contacting and then forming a bond between the two adherends with the adhesive.

In still another embodiment, the present invention includes a method of joining at least two adherends comprising the steps of applying a layer of moisture curable adhesive comprising a polymer or copolymer including reactive silicon end groups to at least one adherend of two adherends; maintaining the two adherends in non-contact with each other for less than about 20 minutes until the adhesive begins to to develop a sufficient tack to hold the at least two adherends together; and first contacting then forming a bond between the two adherends with the adhesive wherein the two adherends can be repositioned after contacting and the adhesive reaches an initial cure in less than thirty minutes.

Additional features and advantages of the invention will be set forth in the detailed description which follows, and in part will be readily apparent to those skilled in the art from that description or recognized by practicing the invention as described herein, including the detailed description which follows and the claims. It is to be understood that both the foregoing general description and the following detailed description are merely exemplary of the invention, and are intended to provide an overview or framework for understanding the nature and character of the invention as it is claimed.

DETAILED DESCRIPTION OF THE INVENTION

The present invention relates to a curable adhesive and more particularly to a moisture curable adhesive. Preferably, the moisture curable adhesive is a one component system. The adhesive composition is preferably formed from a polymer or copolymer, which includes reactive silicon end groups, a filler and a dehydrating agent.

Examples of reactive silicon end groups include but are not limited triethoxysilane, methyldiethoxysilane, trisilanol, any alkoxysilane, substituted silane or multi-silanol, or combinations thereof. Examples of types of polymers or copolymers which could contain the reactive silicon end groups include but are not limited to any polyalkyl oxide; any polyalkane, alkene, or alkyne; substituted alkyl monomers, such as styrene; acrylics or any polymer or copolymer that can be prepared with the silyl (reactive silicon) end groups or combinations thereof. If the adhesive is a moisture curable contact adhesive, preferably it comprises from about 50 to about 90 percent by weight of a polymer or copolymer with reactive silicon end groups; more preferably from about 60 to about 85 percent by weight; and most preferably, from about 65 to about 80 percent by weight. If the adhesive is a moisture curable clear adhesive, preferably it comprises from about 50 to about 90 percent by weight of a polymer or copolymer with reactive silicon end groups; more preferably from about 60 to about 90 percent by weight; and most preferably, from about 65 to about 85 percent by weight. If the adhesive is a moisture curable pigmented adhesive, preferably it comprises from about 10 to about 50 percent by weight of a polymer or copolymer with reactive silicon end groups; more preferably from about 15 to about 40 percent by weight; and most preferably, from about 20 to about 35 percent by weight.

A number of fillers can be used for the moisture curable adhesive composition. If a clear moisture curable adhesive is desired preferably a filler is used that will not substantially interfere with the clarity of the adhesive. By not substantially interfering with the clarity of the adhesive, it is meant that the adhesive with the filler appears to allow the transmission of visible light through it without substantial refraction or absorption of visible light. Preferably, the filler has an index of refraction that is within about 30% of that of the adhesive, more preferably that is within about 20% of that of the adhesive, even more preferably that is within 10% of that of the adhesive, and most preferably within 5% of that of the adhesive. Preferably, a 1 mm thick coating of the adhesive-filler mixture transmits greater than about 60% of the visible spectrum of sunlight, more preferably greater than about 75%, and most preferably greater than about 90%. Examples of clear fillers include but are not limited to fumed amorphous silica including hydrophylic and hydrophobic types, glass microbeads, glass fibers, clear polymer fibers, clear polymer microbeads, clear polymer powders, or combinations thereof. Preferably, the filler for a clear adhesive is a fumed amorphous silica including but not limited to for example hydrophylic fumed silicas and hydrophobic fumed silicas. Examples of these fumed silicas are sold by the Wacker HDK of Munich, Germany under the tradename S13, V15, V15A, N20, N20P for hydrophilic fumed silicas and H15, H15P, H20, H30, H18, H2000 for the hydrophobic fumed silicas. More preferably, the filler for a clear adhesive is a fumed silica sold under the tradename Aerosil OX-50 by Degussa Corporation of Ridgefield Park, N.J. Preferably, the clear adhesive comprises from about 0.01 to about 50 weight % of filler, more preferably from about 0.01 to about 40 weight % and most preferably from about 5 to about 20 weight %. Preferably, the individual clear filler particles have an average surface area of less than about 250 $m^2$/gram, more preferably less than about 150 $m^2$/gram and most preferably less than about 75 $m^2$/gram.

If a clear moisture curable adhesive is not necessary for the application of the adhesive, then a wider range of and greater amounts of fillers may be used. Examples of fillers include but are not limited to those listed above, zinc oxide; reinforcing, semi-reinforcing, and non-reinforcing carbon blacks; white carbon; expanded graphite powders; powdery graphite; crystalline silica; molten silica; silicates; chalk; calcium carbonate including limestone; talc; mica; alumina; aluminum hydroxide; zirconia; titanium dioxide; wollastonite; feldspar; aluminum silicate; solid and hollow ceramic microspheres hollow spheres, ceramic and plastic; metal powders and microbeads; wood flour; dolomite; organic or inorganic pigments, or combinations thereof. Preferably, the filler is calcium carbonate sold under the tradename Microwhite 100 by Imerys of Roswell, Ga. Preferably, the moisture curable adhesive comprises from about 5 to about 90 weight % of filler, more preferably from about 20 to about 85 weight %; even more preferably from about 35 to about 85 weight %; even more preferably from about 43 to about 85 weight %; and most preferably from about 60 to about 85 weight % of filler.

The moisture curable adhesive composition also includes a dehydrating agent. Examples of dehydrating agents include but are not limited to vinyl trimethoxysilane, any vinyl alkoxysilane, inorganic and organic zeolites, and the like. Preferably, the dehydrating agent is vinyl trimethoxysilane sold under the tradename Silquest A-171 by Witco OSI Specialties of Danbury, Conn. Preferably, the adhesive comprises from about 0.01 to about 10% by weight of a dehydrating agent, more preferably from about 0.01 to about 5% by weight; and most preferably from about 0.01 to about 2% by weight of a dehydrating agent.

In addition to the above-described components, the moisture curable adhesive composition of the present invention can optionally include an additive or a combination of additives. Suitable additives include by way of example, but not limitation, anti-oxidants, catalysts, lubricants, extenders, biocides, adhesion promoters, UV absorbers and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization, oxidative degradation or biological attack).

As mentioned above, the moisture curable adhesive composition may also include an adhesion promoter. Examples of adhesion promoters include but are not limited to N-(beta-aminoethyl)-gamma-aminopropyltrimethoxysilane, N-(beta-aminoethyl)-gamma-aminopropyldimethoxymethylsilane, gamma-glycidoxypropltrimethoxylsilane, any substituted silane where one or more of the substitutions contains a different functional group and the like. Preferably, the adhesion promoter is N-(beta-Aminoethyl)-gamma-aminopropyltrimethoxysilane sold under the tradename Siliquest A-1120 by Witco OSI Specialties of Danbury, Conn. Preferably, the moisture curable adhesive composition comprises from about 0.01 to about 5% by weight of an adhesion promoter, more preferably from about 0.4 to about 3% by weight; and most preferably from about 0.5 to about 2% by weight of an adhesion promoter.

The moisture curable adhesive composition may also include an anti-oxidant. Examples of anti-oxidants include but are not limited to sterically hindered phenolics, substituted benzotriazole, hindered amine light stabilizer (HALS), thiodiethylene bis(3,5-di-tert-butyl)-4-hydroxyhydrocinnamate, any other UV-absorber or free-radical scavenger, or combinations thereof. Preferably, the anti-oxidant is selected from the group consisting of sterically hindered phenoloics sold under the tradename Irganox 1010 by Ciba Specialty Chemicals of Tarrytown, N.Y.; substituted benzotriazole sold under the tradename Tinuvin 327 by Ciba Specialty Chemicals of Tarrytown, N.Y.; hindered amine light stabilizer sold under the tradename Tinuvin 770 by Ciba Specialty Chemicals of Tarrytown, N.Y.; and combinations thereof. Preferably, the moisture curable adhesive composition comprises from about 0.01 to about 4% by weight of an anti-oxidant, more preferably from about 0.5 to about 3% by weight; and most preferably from about 1.0 to about 2.5% by weight of an anti-oxidant.

The moisture curable adhesive preferably may also include a catalyst. Conventional catalysts may be used including such catalysts as tertiary amine catalysts, tin catalysts, lead catalysts, bismuth catalysts and the like. Tertiary amine catalysts include by way of example and not limitation include compounds having one tertiary nitrogen atom including triethylamine, N,N-dimethylcyclohexylamine, N-methylmorpholine, N-ethylmorpholine, N-(2-hydroxyethyl)morpholine, N,N-dimethyl-p-toluidine, β-(dimethylamino)propionitrile, N-methylpyrrolidone, N,N-dicyclohexylmethylamine, and the like; compounds having two tertiary nitrogen atoms including N,N, N',N'-tetramethylethylenediamine, N,N,N', N'-tetramethylpropane-1,3-diamine, N,N,N',N'-tetramethylhexane-1,6-diamine, bis (N,N-dimethylaminoethyl)ether, bis(2-dimethylaminoethyl)ether, ethylene glycol bis(3-dimethyl) aminopropyl ether, N'-cyclohexyl-N,N-dimethylformamidine, N,N'-dimethylpiperazine, trimethylpiperazine, 1,2,-peperidinoethane, bis(aminopropyl)piperazine, N-methyl-N'-(2-hydroxyethyl)piperazine, N-methyl-N'-(2-hydroxyethyl)piperazine, N-(N',N'-dimethylaminoethyl)morpholine, bis(morpholinoethyl)ether, bis (2,6-dimethylmorpholinoethyl)ether, 1,2-dimethylimidazole, N-methylimidazole, 1,4-diazine, diazabicyclo[2.2.2]-octane, 1,4-diazabicyclo[3.3.0] oct-4-ene, 1,5-diazabicyclo [4.3.0]non-5-ene, 1,8-diazabicyclo-[5.4.0]-undec-7-ene, phenolates thereof, octoates thereof, and the like; compounds having three tertiary nitrogen atoms including N,N, N',N'',N'''-pentamethyldiethylenetriamine, N,N,N',N'',N'''-pentamethyldipropylenetriamine, tetramethylguanidine, N-cyclohexyl-N',N',N'',N'''-tetramethylguanidine, N-methyl-N'-(2-dimethylamino)ethylpiperazine, 1,5,7-triazabicyclo [4.4.0]dec-5-ene, and the like; and compounds having four nitrogen atoms including 1,1,4,7,10,10-hexamethyltriethylenetetramine, 1,3,5-tris(N,N-dimethylpropyl)hexadro-1,3,5-triazine, and the like.

Tin catalysts include by way of example but not limitation stannous octoate, dibutyltin diacetate, dibutyltin dilaurate, dibutyltin mercaptide, dibutyltin thiocaboxylate, dibutyltin dimaleate, dioctyltin mercaptide, dioctyltin thiocarboxylate, dibutyl tin oxide in diisooctyl phthalate, aliphatic organotin and the like.

Lead, bismuth and mercury catalysts include by way of example but not limitation lead 2-ethylhexanate, bismuth neodecanoate, phenylmercury propionate and the like.

The preferred catalyst of the present invention is an organotin catalyst. Preferably, the moisture curable adhesive composition comprises from about 0.01 to about 4% by weight of a catalyst, more preferably from about 0.01 to about 3% by weight; and most preferably from about 0.3 to about 2% by weight of a catalyst.

The above components of the moisture curable adhesive composition can be mixed using conventional processing equipment and technology. Preferably, steps are taken during the processing of the moisture curable adhesive composition to minimize the pickup of moisture by the composition, and in some instances to reduce the moisture of the composition. Generally this involves heating the mixture and/or pulling a vacuum to remove the water, however, any other method known to those skilled in the art could be used to bring/maintain the moisture content to/at an acceptable level. Preferably, the adhesive composition has a moisture content of less than about 1000 ppm, more preferably less than about 800 ppm, and most preferably less than about 600 ppm as measured by ASTM Test Method D4672. Also preferably the adhesive composition has a moisture content greater than about 200 ppm as measured by ASTM Test Method D4672. Preferably, the moisture curable adhesive composition has a volatile content of less than about 10% by weight, more preferably less than about 5% by weight, even more preferably less than about 3% by weight, even more preferably less than about 1% by weight and most preferably less than about 0.5% by weight of the overall adhesive composition as measured by ASTM Test Method D1490.

Preferably, the moisture curable adhesive has one or more of the following attributes. These include but are not limited to good repositionability over time, a one component system, rapid development of tack, self-leveling, low shrinkage, room temperature application, one coat application, one surface application and the like. In addition, preferably the moisture curable adhesive can be used in low temperature applications and/or over a broad application temperature range.

For good low temperature application and use it is desirable that the moisture curable adhesive have a low glass transition temperature. Preferably, the moisture curable adhesive composition has a glass transition temperature of less than about 0° C., more preferably less than about −20° C. and most preferably less than about −40° C. In order use the adhesive in a variety of environments, it is desirable that the moisture curable adhesive has a broad application temperature range. The application temperature range is the temperature wherein the adhesive can be applied and still cure and function at or near it optimal curing and physical properties. Preferably, the application temperature range is from about −20 to about 60° C., more preferably from about 0 to about 45° C. and most preferably from about 5 to about 38° C. The service temperature range is that range of temperatures in which the cured adhesive will maintain substantially all its strength, adhesion and elasticity. Preferably, substantially all of the adhesive's strength, adhesion and elasticity is greater than 80% of the adhesive's maximum strength adhesion and elasticity over this temperature range. Preferably, the service temperature range for the adhesives of this invention is from about −60° C. to about 160° C.

In order to be able to apply the adhesive easily, preferably the adhesive can be produced with a wide range of viscosities. Depending on the packaging of the adhesive, the application for the adhesive, and the method of applying the adhesive a wide range of viscosities may be necessary. Preferably the adhesive has a viscosity as measured by ASTM D1084-88 Test Method B from the container in which it is stored of from about 1,000 to about 500,000 centipoise; more preferably from about 1,000 to about 300,000 centipoise and most preferably from about 1,000 to about 200,000 centipoise.

In one embodiment of the present invention, a moisture curable adhesive is used to join at least two adherends (or at least two materials or pieces of material to be adhered). The adherends include but are not limited to paper, metal, ceramic, glass, textiles, cloth, plastic, rubber, foams, masonry, wood, leather, composites and the like. Further, the two or more adherends can be of the same or different materials. The moisture curable adhesive comprising a polymer or copolymer including reactive silicon end groups is applied to at least one adherend of the two adherends. The adhesive is preferably a one-part type, but may also be two or more parts. The adhesive can be applied to a single side, both or multiple sides of the adherends similar to conventional adhesives. The adhesive can be applied by conventional methods such as using a persons hands, spatulas, rollers, trowels or sprayers, and dispensed in conventional packaging such as tubes, cans or containers. Preferably, the adhesive is applied that is initially from about 1.1 mm to about 7 mm, more preferably from about 1.3 mm to about 5 mm, and most preferably from about 1.5 to about 4 mm in thickness over at least 25% of the adherend's surface to which the adhesive was applied and which is to be joined to the other adherend.

The surfaces of the at least two adherends to be bonded may be maintained in non-contact with each other until the adhesive develops a sufficient tack to hold the at least two adherends together as a result of exposure to atmospheric moisture. Preferably, the at least two adherends are maintained in non-contact with respect to the other(s) for less than about 20 minutes, more preferably for less than about 15 minutes and most preferably for less than about 10 minutes.

Once the adhesive develops a tack the two adherends are first contacted forming a bond between the at least two adherends with the adhesive. Preferably, the tack is sufficent to temporarily prevent the at least two adherends from pulling apart prior to the curing of the adhesive. Preferably, the adherends can be repositioned for some period of time prior to initial cure. The initial cure is defined as the point at which the assembly can be handled, i.e. moved, without degrading the bond. At this point, the substrates can no longer be repositioned without permanently degrading the bond strength. In the case of a bond where one substrate is immovable, i.e. a wall, it is the point at which bracing is no longer necessary to hold the substrates together. Preferably, the at least two adherends can be repositioned with respect to each other for more than about 5 minutes after they are first contacted, more preferably for more than about 10 minutes, even more preferably for more than about 15 minutes, even more preferably for more than about 20 minutes, even most preferably for more than about 30 minutes. Also preferably, the bond between the at least two adherends is cured sufficiently to prevent further degradation of such bond after a reasonable period of time. The inventors, preferably, consider a 90% cure to be sufficient to make it reasonably difficult to degrade the bond through use or misuse of the bonded adherends. A 90% cure is defined as when about 90% of the available reactive silicon end groups have reacted. At 23° C. and 50% relative humidity, preferably the adhesive is about 90% cured in less than about 24 hours, more preferably is about 90% cured in less than about 16 hours, even more preferably is about 90% cured in less than about 12 hours and most preferably is about 90% cured in less than about 8 hours.

The foregoing detailed description is given for clearness of understanding only, and no unnecessary limitations should be understood therefrom. Hence, numerous modifications and changes can be made by those skilled in the art without departing from the spirit and scope of the invention. The following examples will serve to further typify the nature of the invention but should not be construed as a limitation on the scope thereof, which is defined solely by the appended claims.

EXAMPLES

Example 1

A clear adhesive was made by mixing 626.0 grams (67.2 weight percent) of a polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. mixer keeping the mixer covered to minimize moisture pickup. The Sigma Blade Lab Mixer was started on a low speed and the following were added: 243 grams (26.1 weight percent) of fumed amorphous silica filler with a surface area of 50 $m^2$/gram sold under the tradename Aerosil OX-50 by Degussa Corporation of Ridgefield Park, N.J.; 6.3 grams (0.68 weight percent) of a substituted benzotriazole anti-oxidant sold under the tradename of Tinuvin 327 by Ciba Specialty Chemicals of Tarrytown, N.Y.; 6.3 grams (0.68 weight percent) of a hindered amine light stabilizer anti-oxidant sold under the tradename of Tinuvin 770 by Ciba Specialty Chemicals of Tarrytown, N.Y.; and 6.3 grams (0.68 weight percent) of a sterically hindered phenolic anti-oxidant sold under the tradename Irganox 1010 by Ciba Specialty Chemicals of Tarrytown, N.Y. The mixer was then sealed and heated to between 71° C.–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 12.5 grams (1.34 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 18.8 grams (2.02 weight percent) of N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterward, 12.5 grams (1.34 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

Example 2

A clear adhesive was made by mixing 626.0 grams (67.2 weight percent) of a polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. keeping the mixer covered to minimize moisture pickup. The Sigma Blade Mixer was started on a low speed and the following were added: 203 grams (21.8 weight percent) of fumed amorphous silica filler with a surface area of 50 m$^2$/gram sold under the tradename Aerosil OX-50 by Degussa Corporation of Ridgefield Park, N.J.; 40.0 grams (4.29 weight percent) of fumed amorphous silica filler with a surface area of 110 m$^2$/gram sold under the tradename Aerosil R972 by Degussa Corporation of Ridgefield Park, N.J.; 6.3 grams (0.68 weight percent) of a substituted benzotriazole anti-oxidant sold under the tradename of Tinuvin 327 by Ciba Specialty Chemicals of Tarrytown, N.Y.; 6.3 grams (0.68 weight percent) of a hindered amine light stabilizer anti-oxidant sold under the tradename of Tinuvin 770 by Ciba Specialty Chemicals of Tarrytown, N.Y.; and 6.3 grams (0.68 weight percent) of a sterically hindered phenolic anti-oxidant sold under the tradename Irganox 1010 by Ciba Specialty Chemicals of Tarrytown, N.Y. The mixer was then sealed and heated to between 71–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 12.5 grams (1.34 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 18.8 grams (2.02 weight percent) of N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes.

Afterwards, 12.5 grams (1.34 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

Example 3

A clear adhesive was made by mixing 760.0 grams (76.3 weight percent) of a polypropyleneoxide with a methyldimethoxysilyl functional group sold under the tradename MS Polymer MAX 601 by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: 150 grams (15.1 weight percent) of fumed amorphous silica filler with a surface area of 50 m$^2$/gram sold under the tradename Aerosil OX-50 by Degussa Corporation of Ridgefield Park, N.J.; 15.0 grams (1.51 weight percent) of fumed amorphous silica filler with a surface area of 110 m$^2$/gram sold under the tradename Aerosil R972 by Degussa Corporation of Ridgefield Park, N.J.; 6.0 grams (0.60 weight percent) of a substituted benzotriazole anti-oxidant sold under the tradename of Tinuvin 327 by Ciba Specialty Chemicals of Tarrytown, N.Y.; 6.0 grams (0.60 weight percent) of a hindered amine light stabilizer anti-oxidant sold under the tradename of Tinuvin 770 by Ciba Specialty Chemicals of Tarrytown, N.Y.; and 6.0 grams (0.60 weight percent) of a sterically hindered phenolic anti-oxidant sold under the tradename liganox 1010 by Ciba Specialty Chemicals of Tarrytown, N.Y. The mixer was then sealed and heated to between 71–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 15.2 grams (1.52 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 22.8 grams (2.29 weight percent) of N-(3-trimethoxy-1,2-ethanediamine) silane adhesion promoter sold under the tradename Silquest A-2120 by Witco OSI Specialties of Danbury, Conn. was added to the mixture and mixed at low speed for 5 minutes. Afterwards, 15.2 grams (1.53 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

Example 4

A clear adhesive was made by mixing 689.0 grams (70.3 weight percent) of a polypropyleneoxide with a methyldimethoxysilyl functional group sold under the tradename MS Polymer MAX 601 by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: 204.0 grams (20.8 weight percent) of fumed amorphous silica filler with a surface area of 50 m²/gram sold under the tradename Aerosil OX-50 by Degussa Corporation of Ridgefield Park, N.J.; 13.6 grams (1.39 weight percent) of fumed amorphous silica filler with a surface area of 110 m²/gram sold under the tradename Aerosil R972 by Degussa Corporation of Ridgefield Park, N.J.; 5.4 grams (0.55 weight percent) of a substituted benzotriazole anti-oxidant sold under the tradename of Tinuvin 327 by Ciba Specialty Chemicals of Tarrytown, N.Y.; 5.4 grams (0.55 weight percent) of a hindered amine light stabilizer anti-oxidant sold under the tradename of Tinuvin 770 by Ciba Specialty Chemicals of Tarrytown, N.Y.; and 5.4 grams (0.55 weight percent) of a sterically hindered phenolic anti-oxidant sold under the tradename Irganox 1010 by Ciba Specialty Chemicals of Tarrytown, N.Y. The mixer was then sealed and heated to between 71–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 13.8 grams (1.41 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 29.0 grams (2.96 weight percent) of N-(3-trimethoxy-1,2-ethanediamine) silane adhesion promoter sold under the tradename Silquest A-2120 by Witco OSI Specialties of Danbury, Conn. was added to the mixture and mixed at low speed for 5 minutes. Afterwards, 13.8 grams (1.41 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

Example 5

A clear adhesive was made by mixing 760.0 grams (84.9 weight percent) of a polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: 63.4 grams (7.08 weight percent) of fumed amorphous silica filler with a surface area of 110 m²/gram sold under the tradename Aerosil R972 by Degussa Corporation of Ridgefield Park, N.J.; 6.3 grams (0.70 weight percent) of a substituted benzotriazole anti-oxidant sold under the tradename of Tinuvin 327 by Ciba Specialty Chemicals of Tarrytown, N.Y.; 6.3 grams (0.70 weight percent) of a hindered amine light stabilizer anti-oxidant sold under the tradename of Tinuvin 770 by Ciba Specialty Chemicals of Tarrytown, N.Y. and 6.3 grams (0.70 weight percent) of a sterically hindered phenolic anti-oxidant sold under the tradename Irganox 1010 by Ciba Specialty Chemicals of Tarrytown, N.Y. The mixer was then sealed and heated to between 71–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 15.2 grams (1.70 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 22.8 grams (2.55 weight percent) of N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterwards, 15.2 grams (1.70 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

Example 6

A white adhesive was made by mixing 400.0 grams (31.5 weight percent) of a polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: 220.0 grams (17.3 weight percent) of butyl benzl phthalate sold under the tradename Santicizer 160 by Solutia, Inc. of St. Louis, Mo.; 550.0 grams (43.3 weight percent) of calcium carbonate sold under the tradename Wingdale White by Imerys of Roswell, Ga.; 50.0 grams (3.93 weight percent) of titanium dioxide whitener sold under the tradename Tiona RCL-9 by Millenium Inorganic Chemicals Inc. of Baltimore, Md.; 20.0 grams (1.57 weight percent) of fumed amorphous silica filler with a surface area of 200 m²/gram sold under the tradename Aerosil 200 by Degussa Corporation of Ridgefield Park, N.J.; 3.0 grams (0.24 weight percent) of a substituted benzotriazole anti-oxidant sold under the tradename of Tinuvin 327 by Ciba Specialty Chemicals of Tarrytown, N.Y.; 3.0 grams (0.24 weight percent) of a hindered amine light stabilizer anti-oxidant sold under the tradename of Tinuvin P by Ciba Specialty Chemicals of Tarrytown, N.Y.; and 3.0 grams (0.24 weight percent) of a sterically hindered phenolic anti-oxidant sold under the tradename frganox 1010 by Ciba Specialty Chemicals of Tarrytown, N.Y. The mixer was then sealed and heated to between 71–77° C. While heating a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken. Once the batch had cooled to less than 50° C., then 6.00 grams (0.47 weight percent) of a vinyl trimethoxysilane dehydrating agent sold under the tradename Silquest A-171 Silane by Witco OSI Specialties of Danbury, Conn. was added to the mixture and mixed at low speed for 5 minutes. Afterwards, 10.0 grams (0.79 weight percent) of N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterwards, 6.00 grams (0.47 weight percent) of dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to an air-tight container for further testing.

Example 7

Samples from Examples 1–6 were tested following the procedure established under ASTM D 1084-88 Test Method B to measure the viscosity of the mixture initially and 24 hours later.

| Example No. | Viscosity Initial (centipoise) | Viscosity 24 hours later (centipoise) |
| --- | --- | --- |
| 1 | 4,000 | 48,000 |
| 2 | 72,000 | 464,000 |
| 3 | 16,000 | 200,000 |
| 4 | 48,000 | 784,000 |
| 5 | 128,000 | 200,000 |
| 6 | 80,000 | — |

The testing showed that the viscosity using a fumed amorphous silica was dependent on the surface area of the silica particles used. The viscosity of samples from Examples 2 and 4 were in an unusable range when measured at 24 hours. The testing of the sample from Example 6 also showed that high filler loading can be achieved without increasing the viscosity beyond the usable range of the adhesive.

What we claim is:

1. A moisture curable adhesive, comprising:
   a) a polymer or copolymer having reactive silicon end groups;
   b) from about 0.01 to about 50 percent by weight of a clear filler that will not substantially interfere with the production of clear adhesive selected from both of: i) fumed silica with a surface area of less than 150 $m^2/gram$, and ii) clear filler selected from glass microbeads, glass fibers, clear polymer fibers, clear polymer microbeads, clear polymer powders, or combinations thereof having a surface area from 75 to less than 250 $m^2/gram$; and
   c) from about 0.01 to about 10 percent by weight of a dehydrating agent; and
   wherein the moisture curable adhesive has a viscosity from about 1,000 to about 200,000 centipoise and a glass transition temperature of less than −20° C., and a service temperature range of about −60° C. to about 160° C.

2. The moisture curable adhesive in claim 1, wherein the clear filler is fumed amorphous silica.

3. The moisture curable adhesive in claim 1, wherein the polymer or copolymer having reactive silicon end groups is present in an amount of about 50 to about 90 percent by weight.

4. The moisture curable adhesive in claim 1, wherein the polymer or copolymer having reactive silicon end groups has reactive silicon end groups selected from triethoxysilane, methyldiethoxysilane, trisilanol, or combinations thereof.

5. The moisture curable adhesive in claim 1, wherein the amount of filler is from about 5 to about 20 percent by weight.

6. The moisture curable adhesive in claim 1, wherein the filler includes a filler having a surface area of less than 75 $m^2/gram$.

7. The moisture curable adhesive in claim 1, wherein the adhesive further comprises at least one of a catalyst; antioxidants, lubricants, extenders, biocides, adhesion promoters, UV absorbers and stablizers.

8. The moisture curable adhesive in claim 7, wherein the catalyst is present in an amount from about 0.01 to about 2.5 percent by weight.

9. The moisture curable adhesive in claim 1, wherein the dehydrating agents is selected from vinyl trimethoxysilane, any vinyl alkoxysilane, or inorganic or organic zeolites.

10. The moisture curable adhesive in claim 7, wherein an adhesion promoter is present in an amount of about 0.01 to about 5% by weight.

11. A moisture curable adhesive, comprising:
   a) a polymer or copolymer having reactive silicon end groups;
   b) from about 0.01 to about 50 percent by weight of a blend of fumed amorphous silica fillers one having a surface area of 50 $m^2/gram$ and another one having a surface area of 110 $m^2/gram$; and
   c) from about 0.01 to about 10 percent by weight of a dehydrating agent; and
   d) where the viscosity of the adhesive is in the range of 1,000 to about 200,000 centipoise.

12. A moisture curable adhesive, comprising:
   a) polymer selected from polyalkyl oxide; polyalkane, alkene, alkyne; polymers of styrene, or polymers of acrylics and having reactive silicon end groups;
   b) from about 0.01 to about 50 percent by weight of a blend of clear fillers selected from: i) fumed silica with a surface area of less than 150 $m^2/gram$, and ii) a clear filler having a surface area from 75 to less than 250 $m^2/gram$; and
   c) from about 0.01 to about 10 percent by weight of a dehydrating agent; and
   wherein the moisture curable adhesive has a viscosity from about 1,000 to about 200,000 centipoise and a glass transition temperature of less than −20° C., and a service temperature range of about −60° C. to about 160° C.

13. The moisture curable adhesive in claim 12, wherein the polymer or copolymer having reactive silicon end groups is present in an amount of about 65 to about 85 percent by weight.

14. The moisture curable adhesive in claim 12, wherein the polymer having reactive silicon end groups is polypropylene oxide.

15. The moisture curable adhesive in claim 12, wherein the clear filler is selected from the group of: fillers that have an index of refraction within about 30% of that of the adhesive, fillers that have an index of refraction within about 20% of that of the adhesive, fillers that have an index of refraction within 10% of that of the adhesive, and fillers that have an index of refraction within 5% of that of the adhesive.

16. A moisture curable adhesive, comprising:
   a) polymer or copolymer selected from polyalkyl oxide; polyalkane, alkene, alkyne; polymers of styrene, or polymers of acrylics and having reactive silicon end groups of silyl end groups from triethoxysilane, methyldiethoxysilane, trisilanol, or combinations thereof;
   b) about 5 to about 90 weight percent of a filler having fumed silica with a surface area of less than 250 $m^2/gram$;
   c) about 0.01 to about 10 percent by weight of a dehydrating agent;

d) about 0.01 to about 2.5 percent by weight of a catalyst, and wherein the moisture curable adhesive has a viscosity from about 1,000 to about 500,000 centipoise and a glass transition temperature of less than −20° C., and a service temperature range of about −60° C. to about 160° C.

17. The moisture curable adhesive in claim 16, wherein the adhesive has a viscosity of from about 1,000 to about 200,000 centipoise.

18. The moisture curable adhesive in claim 16, wherein the amount of filler is from about 20 to about 85 percent by weight.

19. The moisture curable adhesive in claim 16, wherein the amount of filler is from about 35 to about 85 percent by weight.

20. The moisture curable adhesive in claim 16, wherein the amount of filler is from about 43 to about 85 percent by weight.

21. The moisture curable adhesive in claim 16, wherein the amount of filler is from about 60 to about 85 percent by weight.

22. The moisture curable adhesive in claim 16, wherein the filler includes a filler having a surface area of less than 150 $m^2$/gram.

23. The moisture curable adhesive in claim 16, wherein the filler includes a filler having a surface area of less than 75 $m^2$/gram.

24. The moisture curable adhesive in claim 16, wherein the filler includes a filler having a surface area of less than 50 $m^2$/gram.

25. The moisture curable adhesive in claim 16, wherein the filler with the surface area less than 250 $m^2$/grams is fumed amorphous silica.

26. The moisture curable adhesive in claim 25, wherein the filler is amorphous fumed silica having a surface area of less than 150 $m^2$/gram present in an amount from 7.08 to about 40 weight percent and the moisture curable adhesive is clear.

27. The moisture curable adhesive in claim 16, which further includes calcium carbonate as a filler.

28. The moisture curable adhesive in claim 16 which has further fillers selected from: zinc oxide; reinforcing, semi-reinforcing, and non-reinforcing carbon blacks; white carbon; expanded graphite powders; powdery graphite; crystalline silica; molten silica; silicates; chalk; calcium carbonate, limestone; talc; mica; alumina; aluminum hydroxide; zirconia; titanium dioxide; wollastonite; feldspar; aluminum silicate; solid ceramic microspheres, hollow ceramic and plastic spheres; metal powders and microbeads; wood flour; dolomite; organic or inorganic pigments, or combinations thereof.

29. The moisture curable adhesive in claim 16, wherein the adhesive further comprises at least one of anti-oxidants, lubricants, extenders, biocides, adhesion promoters, UV absorbers and stablizers.

30. The moisture curable adhesive in claim 16, wherein the dehydrating agents is selected from vinyl trimethoxysilane, any vinyl alkoxysilane, or inorganic or organic zeolites.

31. The moisture curable adhesive in claim 16, which includes an adhesion promoter is present in an amount of about 0.01 to about 5% by weight.

32. The moisture curable adhesive in claim 16, includes an anti-oxidant present in an amount from about 0.01 to about 4% by weight.

33. The moisture curable adhesive in claim 16, wherein the polymer or copolymer having reactive silicon end groups is present in an amount of about 10 to about 50 percent by weight.

34. The moisture curable adhesive in claim 16, wherein the polymer or copolymer having reactive silicon end groups has reactive silicon end groups selected from triethoxysilane, methyldiethoxysilane, trisilanol or combinations thereof.

35. The moisture curable adhesive in claim 16, wherein the polymer or copolymer having reactive silicon end groups is present in an amount of about 50 to about 90 percent by weight.

36. The moisture curable adhesive in claim 11, wherein the adhesive further comprises at least one of a catalyst; anti-oxidants, lubricants, extenders, biocides, adhesion promoters, UV absorbers and stablizers.

37. The moisture curable adhesive in claim 36, wherein the catalyst is present in an amount from about 0.01 to about 2.5 percent by weight.

38. The moisture curable adhesive in claim 36, wherein the adhesion promoter is present in an amount of about 0.01 to about 5% by weight.

39. The moisture curable adhesive in claim 38, wherein the adhesion promoter is selected from N-(beta-aminoethyl)-gamma-aminopropyltrimethoxysilane, N-(beta-aminoethyl)-gamma-aminopropyldimethoxymethylsilane, or gamma-glycidoxypropyltrimethoxylsilane.

40. A clear moisture curable adhesive, comprising:
b) about 50 to about 90 percent by weight polymer or copolymer from polyalkyl oxide; polyalkane, polyalkene, polyalkyne; polymers of alkyl monomers of styrene, or polymers of acrylics and having reactive silicon end groups from triethoxysilane, methyldiethoxysilane, trisilanol, or combinations thereof;
c) about 5 to about 50 weight percent of a filler having fumed silica with a surface area of less than 250 $m^2$/gram; wherein the filler has an index of refraction that is within about 30% of that of the adhesive;
d) about 0.01 to about 10 percent by weight of a dehydrating agent;
e) about 0.01 to about 2.5 percent by weight of a catalyst, and wherein the moisture curable adhesive has a viscosity from about 1,000 to about 500,000 centipoise and a glass transition temperature of less than −20° C.

41. The moisture curable adhesive in claim 40, wherein the amount of filler is from about 20 to about 50 percent by weight.

42. The moisture curable adhesive in claim 40, wherein the dehydrating agents is selected from vinyl trimethoxysilane, any vinyl alkoxysilane, or inorganic or organic zeolites.

43. The moisture curable adhesive in claim 40, wherein the adhesive further comprises at least one of anti-oxidants, lubricants, extenders, biocides, adhesion promoters, UV absorbers, and stablizers.

44. The moisture curable adhesive in claim 43, wherein the adhesion promoter is present in an amount of about 0.01 to about 5% by weight.

45. The moisture curable adhesive in claim 43, wherein the anti-oxidant is present in an amount from about 0.01 to about 4% by weight.

46. The moisture curable adhesive in claim 40, wherein the filler has a surface area of less than 150 $m^2$/gram.

47. The moisture curable adhesive in claim 16, wherein the filler has a surface area of less than 75 $m^2$/gram.

48. The moisture curable adhesive in claim 16, wherein the filler has a surface area of less than 50 $m^2$/gram.

49. The moisture curable adhesive in claim 16, wherein the filler with the surface area less than 250 $m^2$/grams is fumed amorphous silica.

50. A moisture curable adhesive, comprising:
  a) a polymer or copolymer having reactive silicon end groups;
  b) from about 0.01 to about 50 percent by weight of a blend of clear fillers that will not substantially interfere with the production of clear adhesive where one of the fillers of the blend has a surface area of 50 $m^2$/gram and another filler of the blend has a surface area of 110 $m^2$/gram; and
  c) from about 0.01 to about 10 percent by weight of a dehydrating agent; and wherein the moisture curable adhesive has a viscosity from about 1,000 to about 200,000 centipoise and a glass transition temperature of less than −20° C., and a service temperature range of about −60° C. to about 160° C.

* * * * *